United States Patent
Agarawala et al.

(10) Patent No.: US 8,856,675 B1
(45) Date of Patent: Oct. 7, 2014

(54) USER INTERFACE WITH HIERARCHICAL WINDOW DISPLAY

(75) Inventors: Anand Agarawala, Calgary (CA); Adam Cohen, Mountain View, CA (US); Alex Nicolaou, Waterloo (CA); Ben Eidelson, Palo Alto, CA (US); Winson Chung, Palo Alto, CA (US); Michael Jurka, Los Altos, CA (US); Patrick Dubroy, Munich (DE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/298,047

(22) Filed: Nov. 16, 2011

(51) Int. Cl.
*G06F 3/048* (2013.01)

(52) U.S. Cl.
USPC .......................................................... 715/777

(58) Field of Classification Search
CPC ................................................... G06F 3/0483
USPC .......................................................... 715/777
See application file for complete search history.

(56) References Cited

U.S. PATENT DOCUMENTS

| | | | | |
|---|---|---|---|---|
| 6,154,220 A * | 11/2000 | Prakriya et al. | | 345/440 |
| 6,177,936 B1 * | 1/2001 | Cragun | | 715/760 |
| 6,189,019 B1 * | 2/2001 | Blumer et al. | | 715/205 |
| 6,292,188 B1 * | 9/2001 | Carlson et al. | | 715/854 |
| 6,496,842 B1 * | 12/2002 | Lyness | | 715/206 |
| 6,741,268 B1 * | 5/2004 | Hayakawa | | 715/777 |
| 8,473,868 B1 * | 6/2013 | Kauffman | | 715/854 |
| 2004/0093562 A1 * | 5/2004 | Diorio et al. | | 715/513 |
| 2005/0060665 A1 * | 3/2005 | Rekimoto | | 715/810 |
| 2005/0273730 A1 * | 12/2005 | Card et al. | | 715/853 |
| 2008/0005686 A1 * | 1/2008 | Singh | | 715/764 |
| 2008/0016225 A1 * | 1/2008 | Malik | | 709/227 |
| 2008/0270931 A1 * | 10/2008 | Bamford | | 715/777 |
| 2009/0309846 A1 * | 12/2009 | Trachtenberg et al. | | 345/173 |
| 2010/0251116 A1 * | 9/2010 | Rimas-Ribikauskas et al. | | 715/702 |
| 2010/0304731 A1 * | 12/2010 | Bratton et al. | | 455/420 |
| 2011/0055742 A1 * | 3/2011 | Tomono | | 715/766 |
| 2012/0047437 A1 * | 2/2012 | Chan | | 715/720 |

OTHER PUBLICATIONS

Hiroshi, Shimoda (Piro), Tree Style Tab Ver.0.10.2010043001 for Mozilla Firefox, Outsider Reflex, available at http://web.archive.org/web/20100510184207/http:/piro.sakura.ne.jp/xul/_treestyletab.html.en (archived May 10, 2010).*
Li King, SuperDragAndGo, Mozdev.org, available at http://web.archive.org/web/20100330080915/http://superdragandgo.mozdev.org/members.html (archived Mar. 30, 2010).*
Piroor, Tree Style Tab Demonstration of Motion Tween Effect, YouTube, available at http://www.youtube.com/watch?v=M9dUfyoHz3E (posted Apr. 8, 2009).*
Malorkus, I've recently started using the Super Drag 'n' G, Tablet PC Buzz, available at http://www.tabletpcbuzz.com/showthread.php?25133 (posted Aug. 30, 2005).*
Allen, Elise, Aging Tabs, Rock Your Firefox, available at http://rockyourfirefox.com/2010/05/aging-tabs/ (posted May 12, 2010).*

* cited by examiner

*Primary Examiner* — Doon Chow
*Assistant Examiner* — Conrad Pack
(74) *Attorney, Agent, or Firm* — Shumaker & Sieffert, P.A.

(57) ABSTRACT

Methods and apparatus for displaying display windows in a graphical user interface are disclosed. An example method includes opening, on a computing device, a first root browser window and spawning, from a first link in the first root browser window in response to a user toss-gesture associated with the first link, a first subordinate browser window. The example method further includes displaying, in a hierarchical display feature of the computing device, a hierarchical relationship between the first root browser window and the first subordinate browser window so as to visually indicate hierarchical subordinacy of the first subordinate browser window to the first root browser window.

25 Claims, 10 Drawing Sheets

USER INTERFACE WITH HIERARCHICAL WINDOW DISPLAY

BACKGROUND

The use of computing devices, such as personal computers, laptop computers and mobile computing devices (e.g., netbooks and smart phones) that use display windows for applications and web-browsing has continued to increase. When using such devices, a user may open and close different display windows, depending on the particular tasks the user is performing. For instance, a user may use such a computing device to research a particular topic, or to search for an item that the user wishes to purchase from an online retail. As part of this process, the user may launch (e.g., open or spawn) a number of display windows (e.g., application display windows and/or browser display windows). These windows may be launched separately, or may be launched from within another (source) window, such as by selecting a link in the source window. However, once windows are launched, the user may lose track of the relationship between windows and may, therefore, be unable to "re-trace" his or her "steps" by easily determining the relationships between the various display windows the user has opened.

SUMMARY

In a general aspect, a computing device includes a display device, a processor and a non-transitory, machine-readable medium having instructions stored thereon. In the computing device, the instructions, when executed by the processor, cause the computing device to render, on the display device, a graphical user interface (GUI), the GUI having a plurality of display features. The features of the GUI include a single window display feature and a hierarchical display feature configured to display hierarchal relationships between a plurality of individual display windows. The plurality of individual display windows includes a first root window and a first subordinate window. The first subordinate window is spawned from the first root window and, in the hierarchical display feature, is displayed so as to visually indicate hierarchical subordinacy to the first root window.

Implementations may include one or more of the following features. For example, the display device may be a touch-screen display. The instructions, when executed by the processor, may cause the computing device to spawn the first subordinate window in response to a user toss-gesture associated with a link displayed in the first root window, where the user toss-gesture is performed at/on the touch-screen display.

The instructions, when executed by the processor, may cause the computing device to spawn the first subordinate window in response to a user selecting a link displayed in the first root window.

The plurality of individual display windows may include a second subordinate window. The second subordinate window may be spawned from the first root window and, in the hierarchical display feature, displayed so as to visually indicate hierarchical subordinacy to the first root window. The second subordinate window may also, in the hierarchical display feature, be displayed so as to visually indicate hierarchical equivalence to the first subordinate window. The instructions, when executed by the processor, may further cause the computing device to execute a web browser application, the web browser application being configured to provide for bookmarking, as a group, the first root window, the first subordinate window and the second subordinate window.

The instructions, when executed by the processor, may cause the computing device to, when displaying the first root window in the single window display feature, display first respective tabs representing the first subordinate window and the second subordinate window. User selection of one of the first respective tabs may result in the corresponding subordinate window being displayed in the single window display feature. The instructions, when executed by the processor, may cause the computing device to, when displaying the first subordinate window in the single window display feature, display second respective tabs representing the first root window and the second subordinate window. User selection of one of the second respective tabs results in the corresponding first root window or second subordinate window being displayed in the single window display feature. The instructions, when executed by the processor, may cause the computing device to, when displaying the second subordinate window in the single window display feature, display third respective tabs representing the first root window and the first subordinate window. User selection of one of the third respective tabs may result in the corresponding first root window or first subordinate window being displayed in the single window display feature.

The instructions, when executed by the processor, may cause the computing device to spawn the second subordinate window in response to a user selecting a link displayed in the first root window.

The plurality of individual display windows may include a second subordinate window. The second subordinate window may be spawned from the first subordinate window and displayed, in the hierarchical display feature, so as to visually indicate hierarchical subordinacy to the first root window and visually indicate hierarchical equivalence to the first subordinate window. The instructions, when executed by the processor, may cause the computing device to spawn the second subordinate window in response to one of a user toss-gesture associated with a link displayed in the first subordinate window, where the user toss-gesture is performed on a touchscreen display and the user selecting the link. The second subordinate window may be spawned from the first subordinate window and displayed, in the hierarchical display feature, so as to visually indicate hierarchical subordinacy to the first subordinate window.

The single window display feature and the hierarchical display feature may be implemented in a single display mode. Displaying the first subordinate window so as to visually indicate hierarchical subordinacy to the first root window may include displaying a first tab that is representative of the first subordinate window and displaying a second tab that is representative of the first root window, where the second tab is relatively larger than the first tab and visually encompasses the first tab. Displaying the first tab and the second tab may include, for each of the first tab and the second tab, altering, over time, respective appearances of the tabs to indicate a respective amount of time the display window corresponding with the respective tab has been open.

The instructions, when executed by the processor, may cause the computing device to convert the first subordinate window to a second root window in response to a user dragging or tossing, using a pointing device of the computing device, the second thumbnail image away from the first thumbnail image on the GUI.

Displaying the first subordinate window so as to visually indicate hierarchical subordinacy to the first root window may include displaying a first thumbnail image that is representative of the first root window and displaying a second thumbnail image that is representative of the first subordinate window, the second thumbnail image being relatively smaller than the first thumbnail image and being displayed beside the first thumbnail image. Displaying the first thumbnail image and the second thumbnail image may include, for each of the first thumbnail image and the second thumbnail image, altering, over time, a respective appearance of the thumbnail image to indicate a respective amount of time the display window corresponding with the respective thumbnail image has been open. The instructions, when executed by the processor, may cause the computing device to convert the first subordinate window to a second root window in response to a user dragging or tossing, using a pointing device of the computing device, the second thumbnail image away from the first thumbnail image on the GUI.

The single window display feature may be implemented in a single window display mode and the hierarchical display feature may be implemented in a hierarchical display mode. The instructions, when executed by the processor, may cause the computing device to switch from the hierarchical display mode to the single window display mode in response to a user pinch-out gesture associated with one of the first thumbnail image and the second thumbnail image, where the user pinch-out gesture is performed at/on a touch-screen display. The instructions, when executed by the processor, may cause the computing device to switch from the single window display mode to the hierarchical display mode in response to a user pinch-in gesture, the user pinch-in gesture being performed at/on the touch-screen display.

The plurality of individual display windows may include a second root window and a second subordinate window. The second root window may be displayed, in the hierarchical display feature, so as to visually indicate hierarchical equivalence with the first root window. The second subordinate window may be spawned from the second root window and, in the hierarchical display feature, displayed so as to visually indicate hierarchical subordinacy to the second root window. The instructions, when executed by the processor, may cause the computing device to, in response to a user push-gesture performed at/on a touch-screen display in the hierarchical display feature, visually space the second root window and the second subordinate window away from the first root window and the first subordinate window.

The instructions, when executed by the processor, may cause the computing device to spawn the first root window from a link in a native application display window. The first root window and the first subordinate window may be browser display windows. The instructions, when executed by the processor, may cause the computing device to execute a web browser application, the web browser application may provide for bookmarking, as a group, the first root window and the first subordinate window.

In another general aspect, a computer-implemented method includes opening, on a computing device, a first root browser window and spawning, from a first link in the first root browser window using a user toss-gesture, a first subordinate browser window. The method further includes displaying, in a hierarchical display feature of the computing device, a hierarchical relationship between the first root browser window and the first subordinate browser window so as to visually indicate hierarchical subordinacy of the first subordinate browser window to the first root browser window.

Implementations may include one or more of the following features. For example, the method may include spawning, from a second link in the first root browser window, a second subordinate browser window. The method may include displaying, in the hierarchical display feature, the first root browser window, the first subordinate browser window and the second subordinate browser window, so as to visually indicate hierarchical subordinacy of the second subordinate browser window to the root browser window and hierarchical equivalence of the second subordinate browser window to the first subordinate browser window.

The method may include converting the first subordinate browser window to a second root browser window in response to a user, using a pointing device in the hierarchical display feature, dragging or tossing the first subordinate browser window away from the first root browser window. The second root browser window may be displayed, in the hierarchical display feature, so as to indicate hierarchical equivalence with the first root browser window.

In another general aspect, a recordable storage medium has recorded and stored thereon instructions that, when executed, cause a computing device to render, on a display device, a graphical user interface (GUI), the GUI having a plurality of display features. The display features include a single window display feature and a hierarchical display feature. The hierarchical display feature is configured to display hierarchal relationships between a plurality of individual display windows. The plurality of individual display windows includes a first root window and a first subordinate window. The first subordinate window is spawned from the first root window in response to a user toss-gesture. The first subordinate window, in the hierarchical display feature, is displayed so as to visually indicate hierarchical subordinacy to the first root window.

Implementations may include one or more of the following features. For example, the instructions, when executed, may cause the computing device to execute a web browser application. The web browser application may be configured to provide for bookmarking, as a group, the first root window, the first subordinate window and the second subordinate window.

The instructions, when executed, may cause the computing device to convert the first subordinate window to a second root window in response to a user dragging or tossing, using a pointing device of the computing device, the second thumbnail image away from the first thumbnail image on a graphical user interface of the computing device. The instructions, when executed, may cause the computing device to switch from a hierarchical display mode implementing the hierarchical display feature to a single window display mode implementing the single window display feature in response to a user pinch-out gesture associated with one of the first thumbnail image and the second thumbnail image, the user pinch-out gesture being performed at/on a touch-screen display of the computing device. The instructions, when executed, may cause the computing device to switch from the single window display mode to the hierarchical display mode in response to a user pinch-in gesture, the user pinch-in gesture being performed at the touch-screen display.

DETAILED DESCRIPTION

Figure 1:
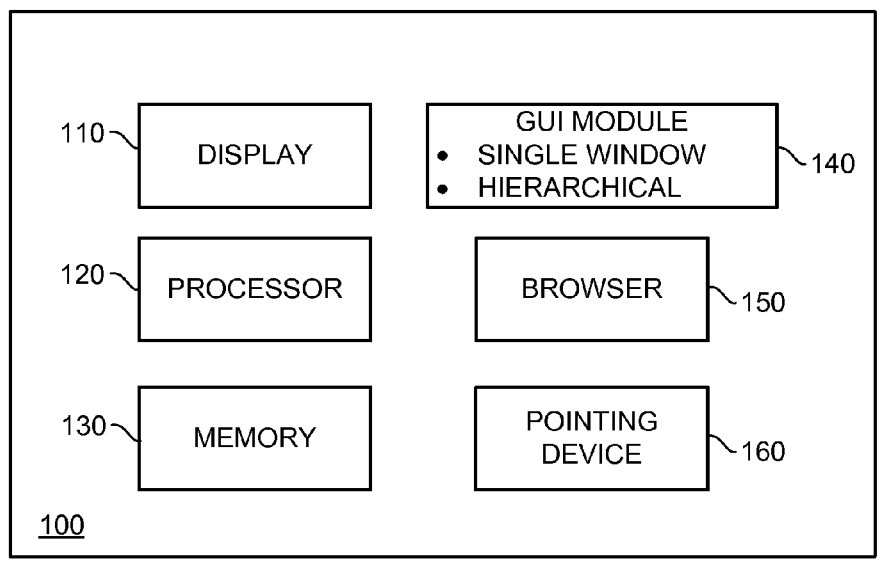
FIG. 1 is a block diagram illustrating a computing device in accordance with an example embodiment.

FIG. 1 is a block diagram illustrating a computing device 100 in accordance with an example embodiment. The computing device 100, which may be used to implement the techniques described herein, is shown by way of example. It will be appreciated, however, that computing devices with other configurations and arrangements may be similarly used. Depending on the particular embodiment, the computing device 100 may include additional components or, in other instances, certain components of the computing device 100 shown in FIG. 1 may be eliminated. For instance, in embodiments that include a touch screen display, the pointing device shown in FIG. 1 may be eliminated, as that functionality may be implemented using the touch-screen display. Further, the computing device 100 may take a number of forms. For example the computing device 100 may be a personal computer, a laptop computer, a tablet computer, a netbook computer or a mobile communication device, such as a smart phone, as some examples.

As shown in FIG. 1, the computing device 100 includes a display device 110, a processor 120, a memory 130, a graphical user interface (GUI) module 140, a web browser application (browser) 150 and a pointing device 160. In the computing device 100, the display device 110 may be a LCD display device, a touch-screen display device, or may take a number of other appropriate forms. The memory 130 may be configured to store machine-readable instructions for implementing the approaches described herein on the computing device 100. For instance, the processor 120 may be configured to execute those instructions to implement the approaches described herein, as well as to operate and/or control other components of the computing device 100, such as the display 110, the GUI module 140, the browser 150, and/or the pointing device 160. The memory 130 may also include instructions for implementing one or more native applications on the computing device 100, such as, for example, an e-mail program, a word processor program or a number of other application programs (e.g., such as the browser 150).

In the computing device 100, the GUI module 140 may be configured to operate in conjunction with the processor 120 and the memory 130 to implement a GUI on the display device 110. For instance, the GUI module 140 may be configured to implement a GUI on the display device 110 that includes a single window display feature and a hierarchical display feature. In certain embodiments these display features may be implemented in a single display mode, while in other embodiments these display features may be implemented in separate display modes (e.g., a single window display mode and a hierarchical display mode), such as in the fashions described herein.

In the computing device 100, the browser 150 may be used to view various types of content, such as Web content, where such content is viewed in a plurality of browser display windows. The GUI module 140 may provide for displaying such browser display windows individually using the single window display feature.

The GUI module 140 may also provide for displaying hierarchical relationships between individual browser display windows using the hierarchical display feature. For instance, the hierarchical display feature may be used to display hierarchical relationships for browsing threads (such as for one or more root windows and one or more respectively subordinate windows, as described herein). Depending on the particular embodiment, such hierarchical relationships may be displayed in conjunction with a single window display, or may be displayed separately in a hierarchical display mode. Additionally, the browser 150 may be configured to bookmark such hierarchal relationships between display windows. For example, the browser 150 may be configured to save a single bookmark that includes the hierarchal relationships between display windows of a browsing thread.

Figure 2A:
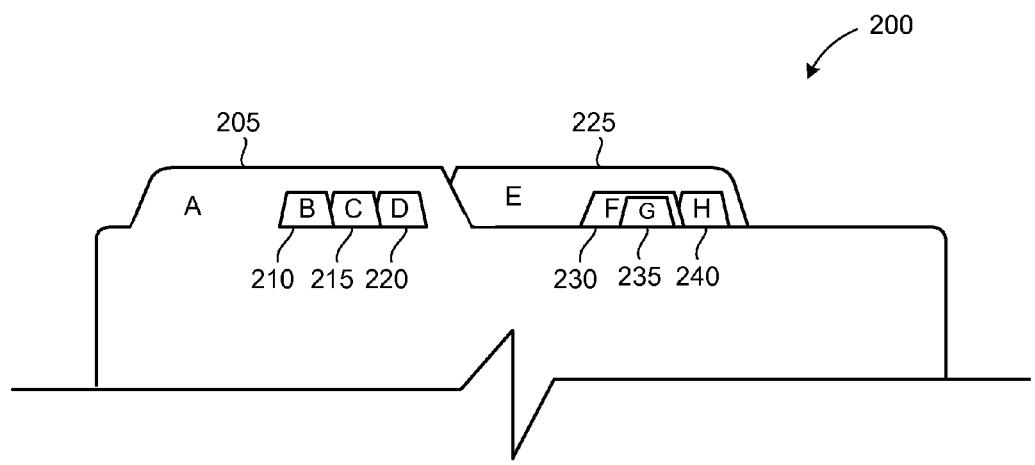
FIGS. 2A and 2B are diagrams illustrating hierarchical relationships of display windows that may be used in a graphical user interface in accordance with two example embodiments.
Figure 2B:
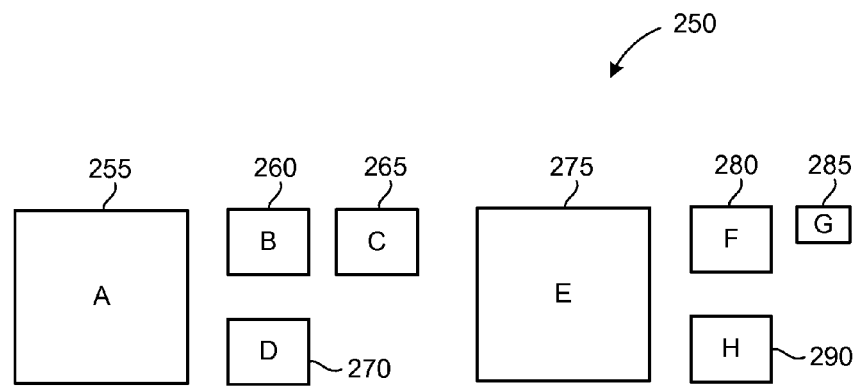

FIGS. 2A and 2B are diagrams 200 and 250 illustrating hierarchical relationships of display windows that may be used in a GUI in accordance with two example embodiments. The approaches illustrated in FIGS. 2A and 2B may be implemented in the computing device 100 illustrated in FIG. 1. Accordingly, for purposes of illustration, the diagrams 200 and 250 will be described with further reference to FIG. 1. It will be appreciated, however, that the techniques illustrated in FIGS. 2A and 2B may be implemented in computing devices other than the computing device 100 shown in FIG. 1. Also for purpose of this disclosure, the terms "window" and "display window" may be used interchangeably. Likewise, the terms "browser window" and "browser display window" may also be used interchangeably with each other and with the terms "window" and "display window."

The diagram 200 of FIG. 2A illustrates an example embodiment where a single window display feature and a hierarchical display feature of a GUI may be implemented in a single display mode. FIG. 2B, in comparison, illustrates an example embodiment where a single window display feature and a hierarchical display feature of the GUI may be implemented in separate display modes, such as, respectively, a single window display mode and a hierarchical display mode. The diagram 250 in FIG. 2B illustrates an example of an example arrangement that may be implemented as part of a hierarchical display mode in a GUI of the computing device 100, such as may be implemented by the GUI module 140.

Referring to FIG. 2A, a plurality of display windows (e.g., such as browser display windows) may be represented by a plurality of tabs 205-240. The arrangement of the tabs 205-240 shown in FIG. 2A may be used to visually indicate (illustrate) hierarchical relationships (e.g., as part of a hierarchical display feature) between the individual display windows represented by the tabs 205-240. Further, the arrangement shown in the diagram 200 may also be used to display individual display windows (e.g., as part of a single window display feature), which may be displayed as a result of a user selecting one of the tabs 205-240, though individual display windows may be displayed as a result of events other than a user selection, such as a display window being activated by the browser 150, for example. As illustrated in FIG. 2A, a display window 'A' that is associated with the tab 205 may be displayed in a GUI that is implemented using the approach shown in FIG. 2A (e.g., after the tab 205 is selected by a user or activated by the browser 150). The display windows associated with the other tabs shown in FIG. 2A may be displayed in similar fashion.

In the diagram 200, the tabs 205 and 225 may represent root display windows 'A' and 'E', respectively. In an example embodiment, the display windows represented by tabs 205 and 225 may be browser windows (browser display windows) that are used as respective root browser windows for separate, respective browsing threads. In the example shown in FIG. 2A, display windows 'B', 'C' and 'D', which are represented respectively by the tabs 210, 215 and 220, may be browser windows that are subordinate to the browser window A and part of a single browsing thread for the root browser window A that is represented by the tab 205. For instance, the browser windows represented by the tabs 210, 215 and 220 may be subordinate to the browser window A as a result of those browser windows being spawned (launched) from links included in the browser window A. Example techniques for spawning display windows are described below with respect to FIGS. 3A and 3B.

Alternatively, in certain embodiments, one or more of the subordinate browser windows B, C, D could be spawned from one another. For instance, the browser window B may be spawned from a link included in the browser window A, and then the browser window C may be spawned from a link included in the browser window B. In the diagram 200, the arrangement of the tabs 210-220 may indicate that the browser windows B, C and D represented by those tabs are hierarchically equivalent. In other instances, additional levels of hierarchy are possible and may be illustrated using similar techniques, such as in the fashion discussed below with respect to display windows 'F', 'G' and 'H'.

In the example shown in FIG. 2A, display windows 'F', 'G' and 'H', which are represented respectively by the tabs 230, 235 and 240, may represent browser windows that are subordinate to the browser window E represented by the tab 225. Further, the browser window G represented by the tab 235 may be further subordinate to the browser window F represented by the tab 230. In this example, the browser windows F and H that are represented by the tabs 230, and 240 may be spawned (launched) from respective links included in the browser window E. Further in this example, the browser window G that is represented by the tab 235 may be spawned from a link included in the browser window F, which is represented by the tab 230, though other approaches for defining such hierarchical relationships are possible.

In this example, as may be seen in the diagram 200, the hierarchical relationships of the browser windows A-H may be visually indicated by the arrangement of the tabs 205-240. For example the tabs 210, 215 and 220 may represent browser display windows B, C and D that are subordinate to the browser display window A, which is represented by the tab 205. To illustrate the subordinacy of the browser windows B, C and D to the browser window A, the tabs 210, 215 and 220 are shown as being relatively smaller than the tab 205 and are also shown as being visually encompassed by the tab 205. This arrangement may be used in a GUI to visually indicate the subordinacy of the browser display windows B, C and D to the browser display window A.

In the diagram 200, the tabs 230, 235 and 240 may represent browser display windows F, G and H that are subordinate to the browser display window E which is represented by the tab 225. Further, the tab 235, which represents the browser display window G, visually indicates that the browser window G is further subordinate to the browser display window F, which is represented by the tab 230. As illustrated in FIG. 2A, the tab 235 is relatively smaller than, and visually encompassed by the tab 230, so as to visually indicate the subordinacy of the browser display window G to the browser display window F. Also, the tabs 230 and 240 are relatively smaller than, and visually encompassed by the tab 225 to visually indicate the subordinacy of the browser windows F and H to the browser window E. In the diagram 200, the arrangement of the tabs 230 and 240 may indicate that the browser windows F and H represented by those tabs are hierarchically equivalent. Likewise, the arrangement of the tabs 205 and 225 may visually indicate that the browser windows A and E represented by those tabs are hierarchically equivalent to each other (e.g., both are root browser windows).

Referring now to FIG. 2B, the diagram 250 illustrates an alternative approach that may be used in a GUI to visually indicate hierarchical relationships of individual display windows, such as browser display windows. The diagram 250 illustrates the same hierarchal relationships for browser windows A-H that were discussed above with respect to FIG. 2A. Accordingly, for purposes of brevity and clarity, the specific details of the various example hierarchical relationships of the browser windows A-H discussed above with respect to FIG. 2A are not repeated in detail with respect to FIG. 2B. It will be appreciated, however, that those hierarchical relationships may be equally relevant in the diagram 250.

As was noted above, the diagram 250 illustrates an example of a display that may be implemented as part of a hierarchical display mode in a GUI, such as may be implemented by the GUI module 140 of the computing device 100. In the diagram 250, thumbnail images (thumbnails) 255-290 may represent, respectively, the browser windows A-H. In FIG. 2B, the thumbnails 255 and 275 may, respectively, represent the browser window A and the browser window E (e.g., the root browser windows in this example). Further the thumbnails 260, 265 and 270 may, respectively, represent the browser windows B, C and D, which are visually indicated as being subordinate to the browser window A in the diagram 250. For instance, to illustrate the subordinacy of the browser windows B, C and D to the browser window A, the thumbnails 260, 265 and 270 are shown as being relatively smaller than the thumbnail 255 and are also illustrated to the side of the thumbnail 255 in a "strip" arrangement. This arrangement may be used in a hierarchical display mode of a GUI to visually indicate the subordinacy of the browser display windows B, C and D to the browser display window A.

In the example shown in FIG. 2B, display windows F, G and H, which are represented respectively by the thumbnails 280, 285 and 290, may represent browser windows that are subordinate to the browser window E represented by the thumbnail 275. Further, the browser window G (represented by the thumbnail 285) may be further subordinate to the browser window F represented by the thumbnail 280. In this example, the browser windows F and H (represented by the thumbnails 280 and 290) may be spawned (launched) from respective links included in the browser window E, while the browser window G (represented by the thumbnail 285) may be spawned from a link included in the browser window F, which is represented by the thumbnail 280, though other approaches for defining such hierarchical relationships are possible. To visually indicate the subordinacy of the browser window G to the browser window F in this example, the thumbnail 285 is shown as being relatively smaller than the thumbnail 280 and is illustrated to the side of the thumbnail 280. The arrangement of the thumbnails 275-290 further extends the strip arrangement of the diagram 250 discussed above.

Figure 3A:
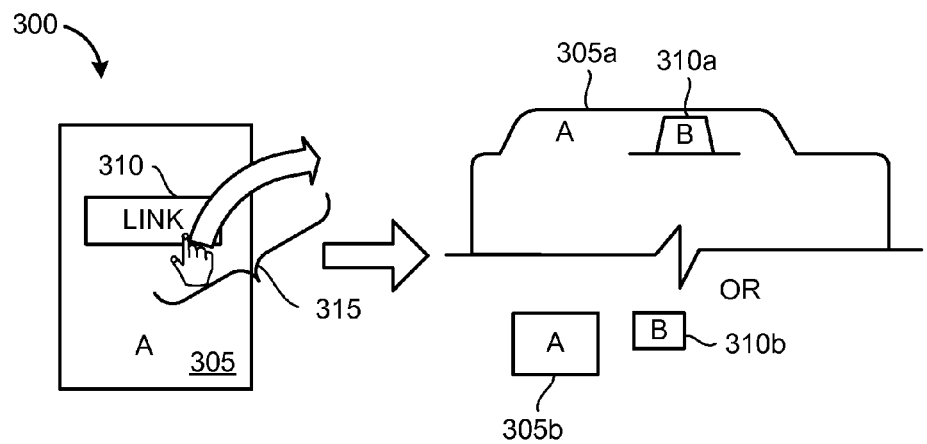
FIGS. 3A and 3B are diagrams illustrating processes for spawning display windows in accordance with two example embodiments.
Figure 3B:
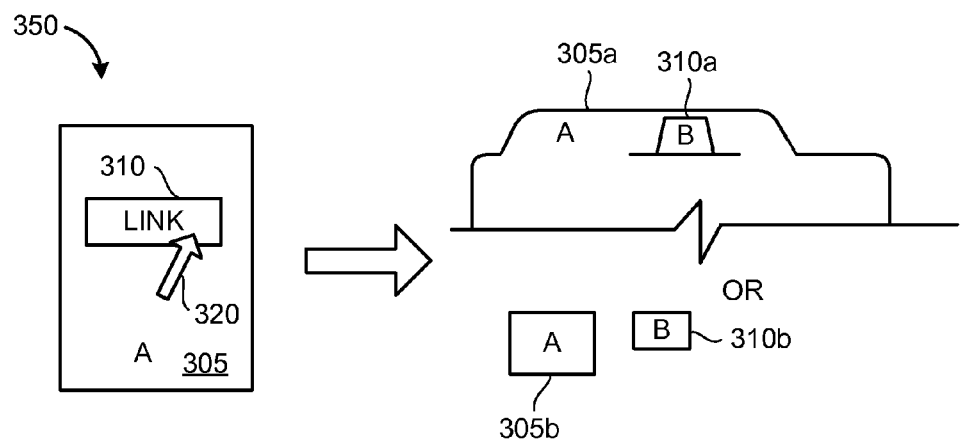

FIGS. 3A and 3B are diagrams 300 and 350 illustrating processes for spawning subordinate display windows (e.g., subordinate browser windows) in accordance with two example embodiments. For instance, either of the processes illustrated in diagrams 300 and 350 may be used to generate a subordinate browser window B from a link 310 in a root browser window A 305. Like elements in the diagrams 300 and 350 are referenced using like reference numerals.

In the diagram 300, the browser window B may be generated from the link 310 using a user toss-gesture 315 on a touch-screen display, where the user simulates tossing the link 310 by placing his or her finger on the link and sliding across the surface of the touch-screen display and then lifting his or her finger while sliding. In the diagram 350, the browser window B may be generated from the link 310 by clicking the link 310 using, for example, a pointing device, such as the pointing device 160 of the computing device 100 illustrated in FIG. 1. Such approaches may be used to spawn other subordinate display windows, such as the display windows B, C, D, F, G and H discussed above with respect to FIGS. 2A and 2B. Of course, other approaches for spawning subordinate browser windows may also be used.

Once the browser window B has been spawned as a subordinate browser window of the root browser window A 305, the hierarchical relationship between the browser window A 305 and the browser window B may be visually indicated (illustrated) using the techniques described above with reference to FIGS. 2A and 2B. Illustrations using such approaches are illustrated in FIGS. 3A and 3B on the right side of the diagrams 300 and 350. These illustrations of the hierarchical relationships of the browser windows A and B are the same in both FIGS. 3A and 3B. Accordingly, for purposes of brevity, this particular arrangement is described once and, as will be appreciated, applies equally to both of the diagrams 300 and 350.

As shown in the diagrams 300 and 350, a hierarchical relationship of the browser window A 305 and the browser window B may be represented visually using tab 305a to represent the browser window A 305 and 310a to represent the browser window B. The subordinacy of the browser window B to the browser window A is visually indicated by the arrangement of the tabs 305a and 310a, such as in like fashion as was discussed above with respect to FIG. 2A.

Similarly, the hierarchical relationship of the browser window B and the browser window A 305 may be represented visually using a thumbnail 305b that represents the browser window A 305 and a thumbnail 310b that represents the browser window B. The subordinacy of the browser window B to the browser window A 305 is visually indicated by the arrangement of the thumbnails 305a and 305b, such as in like fashion as discussed above with respect to FIG. 2B.

Figure 4A:
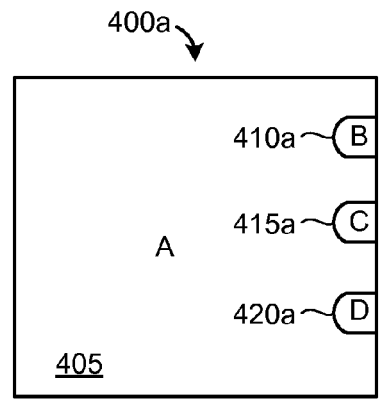
FIGS. 4A, 4B and 4C are diagrams illustrating display windows that may be used in a graphical user interface in accordance with an example embodiment.
Figure 4B:
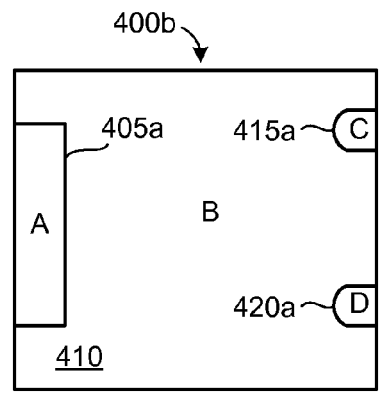
Figure 4C:
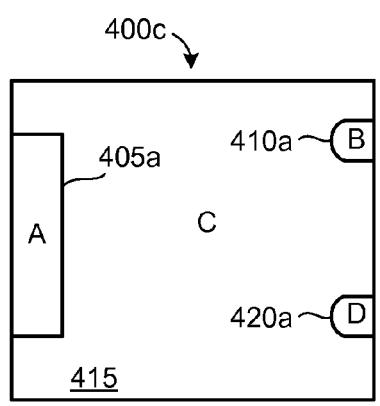

FIGS. 4A, 4B and 4C are diagrams 400a, 400b and 400c, which illustrate, respectively, display windows 405, 410 and 415 that may be used in a GUI in accordance with an example embodiment. In this example, the display windows 405, 410 and 415 may be implemented (e.g., separately) in a single window display mode of a GUI, such as has been described herein. In the display windows 405, 410 and 415, tabs representing subordinate and/or superordinate (root or parent) display windows may be overlaid on the single display windows illustrated in FIGS. 4A, 4B and 4C. In such an approach, the subordinate and/or superordinate display windows may be accessed (displayed as a single window) by selecting, using a touch-screen or pointing device, a given display window's corresponding overlaid tab.

For example, the display window 405 shown in FIG. 4A (for a root browser window A 405) may include a tab 410a that corresponds with a subordinate display (browser) window B 410, a tab 415a that corresponds with a subordinate display window C 415 and a tab 420a that corresponds with a subordinate display window D, such as in like fashion as the hierarchical relationships of the browser windows A, B, C and D discussed above with respect to FIGS. 2A and 2B. Similarly, for the same hierarchical relationship, the display window B 410 shown in FIG. 4B includes a tab 405a that corresponds with the root browser window A 405, the tab 415a that corresponds with the subordinate browser window C 415 and the tab 420a that corresponds with the subordinate browser window D. In this example, the tab 405a corresponding with the root browser window A 405 may be larger than the tabs for the subordinate windows and placed on an opposite side of the display window 410 to visually indicate the hierarchical relationships of the windows represented by the overlaid tabs.

In like fashion as in FIGS. 4A and 4B, for the same hierarchical relationship, the display window C 415 shown in FIG. 4C may include the tab 405a that corresponds with the root browser window A 405 (with like sizing and placement as discussed above), the tab 410a that corresponds with the subordinate browser window B 410 and the tab 420a that corresponds with the subordinate browser window D. It will be appreciated that the arrangements of the display windows 405, 410 and 415 shown in FIGS. 4A, 4B and 4C are given by way of example and other arrangements are possible.

Figure 5A:
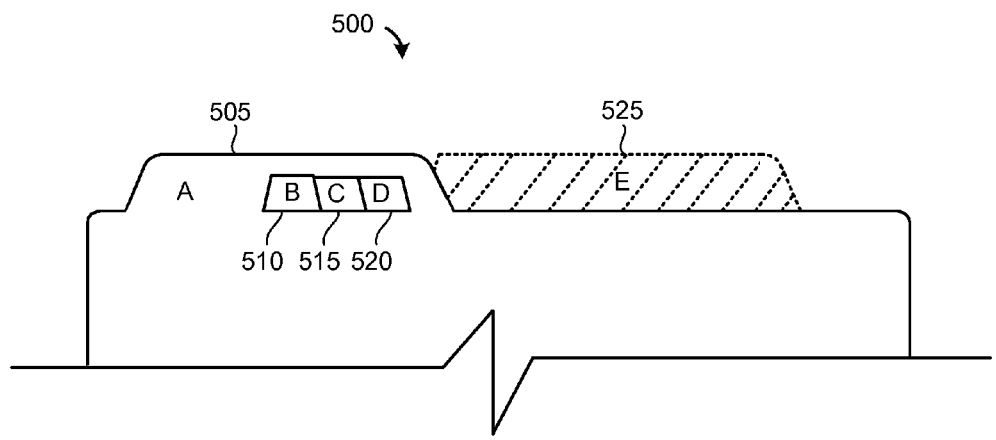
FIGS. 5A and 5B are diagrams illustrating techniques that may be used in a graphical user interface to indicate how long given display windows have been open in accordance with two example embodiments.
Figure 5B:
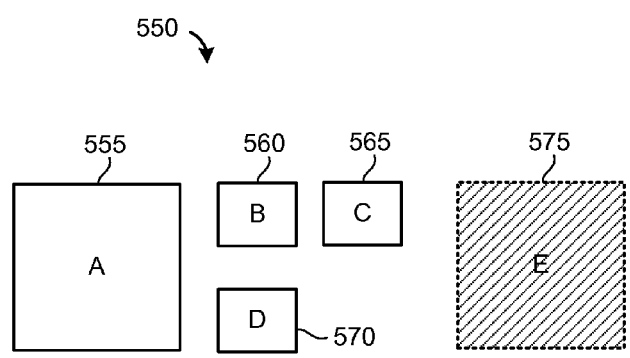

FIGS. 5A and 5B are diagrams 500 and 550 illustrating techniques that may be used in a GUI to indicate how long given display windows have been open in accordance with two example embodiments. The diagrams 500 and 550 illustrate the same hierarchical relationships for browser windows A, B, C, D and E. In FIGS. 5A and 5B, the browser windows B, C and D are subordinate to the root browser window A, while the browser window E is a root browser window and is hierarchically equivalent with the browser window A. In FIG. 5A, the browser windows A, B, C, D and E are represented, respectively, by tabs 505, 510, 515, 520, and 525, while in FIG. 5B they are represented, respectively by thumbnails 555, 560, 565, 570 and 575.

In the examples illustrated in FIGS. 5A and 5B, the appearance of the tab 525 and/or the thumbnail 575 corresponding with the browser window E may be modified over time to illustrate how long the browser window E has been open. For instance, the appearance of the tab 525 or the thumbnail 575 may be rendered over time to slowly fade, appear increasing worn or appear to crumple up over time, as some examples. These techniques are represented in FIGS. 5A and 5B by the altered appearance of the tab 525 and the thumbnail 575 as compared to the other tabs and thumbnails, respectively. In other embodiments, other visual techniques than those discussed above may be used to visually indicate the age of a given browser window, such as blacking out tabs and/or thumbnails. Using such approaches, the relative ages of different browser windows may be easily evaluated based on a comparison of the change in their appearance relative to each other, as well to a tab and/or thumbnail that corresponds with a newly opened browser window. Such techniques may, of course, be applied to other tabs and/or thumbnails, and the examples illustrated in FIGS. 5A and 5B are given merely by way of example and for purposes of illustration.

Figure 6A:
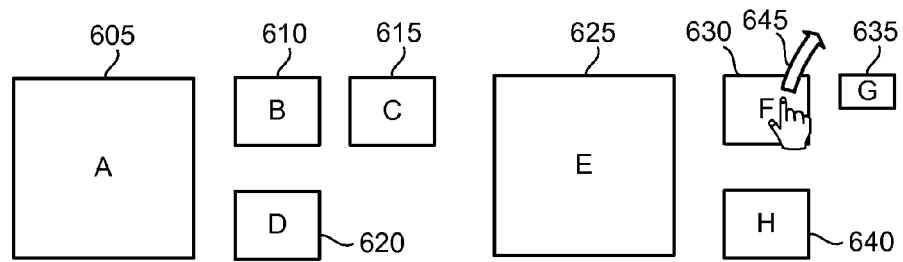
FIGS. 6A and 6B are diagrams illustrating a process for converting a subordinate display window to a root display window in accordance with an example embodiment.
Figure 6B:
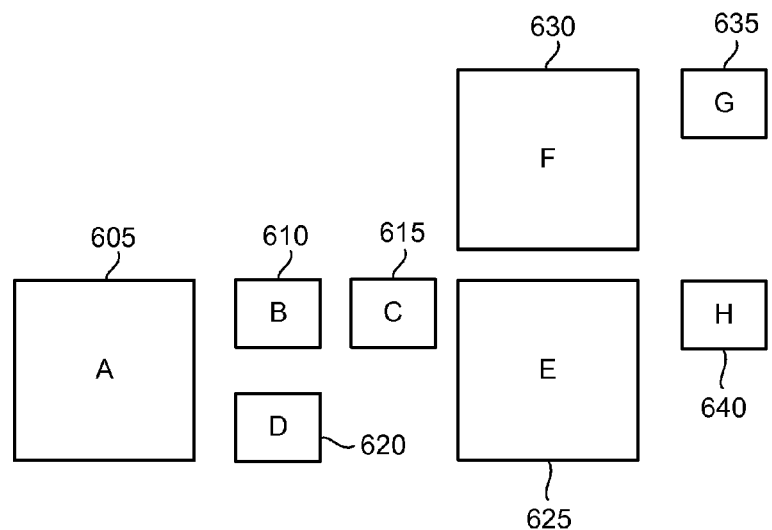

FIGS. 6A and 6B are diagrams illustrating a process for converting a subordinate display window to a root display window in accordance with an example embodiment. In FIG. 6A, the same hierarchical relationships of browser windows A, B, C, D, E, F, G and H as discussed above with respect to FIG. 2B are illustrated. In FIG. 6A, these browser windows are represented, respectively by thumbnails 605, 610, 615, 620, 625, 630, 635 and 640. As shown in FIG. 6A, the user may use a toss-gesture 645 to toss the thumbnail 630 corresponding with the display window F out of, or away from the strip view of thumbnails shown in FIG. 6A.

The results of the toss-gesture 645 in FIG. 6A, for this example, are shown in FIG. 6B. As may be seen in FIG. 6B, the thumbnail 630 that represents the display window F has been converted to a root browser window that is hierarchically equivalent with the root browser window A (thumbnail 605) and the root browser window E (thumbnail 625). As may also be seen in FIG. 6B, the browser window G (thumbnail 635) remains subordinate to the browser window F as a result of the toss-gesture 645 of FIG. 6A. However, the browser window G is now hierarchically equivalent with the browser windows B, C, D and H, e.g., is one hierarchical level below its corresponding root browser window. In other embodiments, the subordinacy of the browser window G could be modified such that the browser window becomes directly subordinate to the browser window E as a result of the toss-gesture 645 of FIG. 6A. Of course other approaches may be used to convert subordinate browser windows to root browser windows, or to change other hierarchical relationships between display windows. For instance, similar results could be achieved by dragging a thumbnail (or a tab) using a pointing device (e.g. a mouse) in like fashion as the toss-gesture 645.

Figure 7:
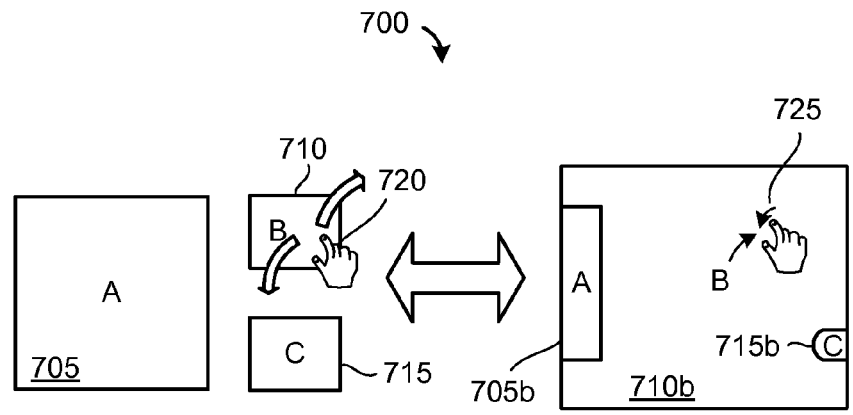
FIG. 7 is a diagram illustrating processes for switching between a single window display mode and a hierarchical display mode in accordance with an example embodiment.

FIG. 7 is a diagram 700 illustrating processes for switching between a single window display mode (right side of diagram 700) and a hierarchical display mode (left side of diagram), such as described herein, in accordance with an example embodiment. As shown in FIG. 7 (to the left of the double ended arrow), a thumbnail 705 representing a root browser window A, a thumbnail 710 representing a subordinate browser window B and a thumbnail 715 representing a subordinate browser window C are shown. In like fashion as has been described herein, the browser window B and the browser window C are visually indicated (illustrated) as being subordinate to the root browser window A.

As shown in FIG. 7, using a touch-screen display, a user may apply a pinch-out gesture 720 to one of the thumbnails 705, 710 and 715. As illustrated in FIG. 7, such a pinch-out gesture 720 is applied to the thumbnail 710 that represents the browsing window B. In the diagram 700, the results of the pinch-out gesture 720 are shown on the right side of the double ended arrow. As shown in FIG. 7, the pinch out gesture 720 may cause a computing device, such as the computing device 100, to switch from the hierarchical display mode (such as shown on the left side of the diagram 700) to a single window display mode (such as shown on the right side of the diagram 700). In other instances, the pinch-out gesture 720 may be applied to the other thumbnails 705 and 715 illustrated in FIG. 7 and produce similar results to those describe with respect to the diagram 700.

In this example, the browser window B 710b is displayed in the single window display mode illustrated in the right-hand side of the diagram 700. As is also shown in FIG. 7, the display window B 710b may include an overlay tab 705b (representing the root display window A) and an overlay tab 715b (representing the subordinate display window C) in like fashion as discussed above is respect to FIGS. 4A, 4B and 4C. As illustrated in the right-hand side of the diagram 700, a pinch-in gesture 725 may be applied by a user to the display window B 710b when displayed in the single window display mode. In this example, as a result of the pinch-in gesture 725, the computing device (100) may switch from the single window display mode (illustrated on the right-hand side of the diagram 700) back to the hierarchical display mode (illustrated on the left-hand side of the diagram 700).

Figure 8:
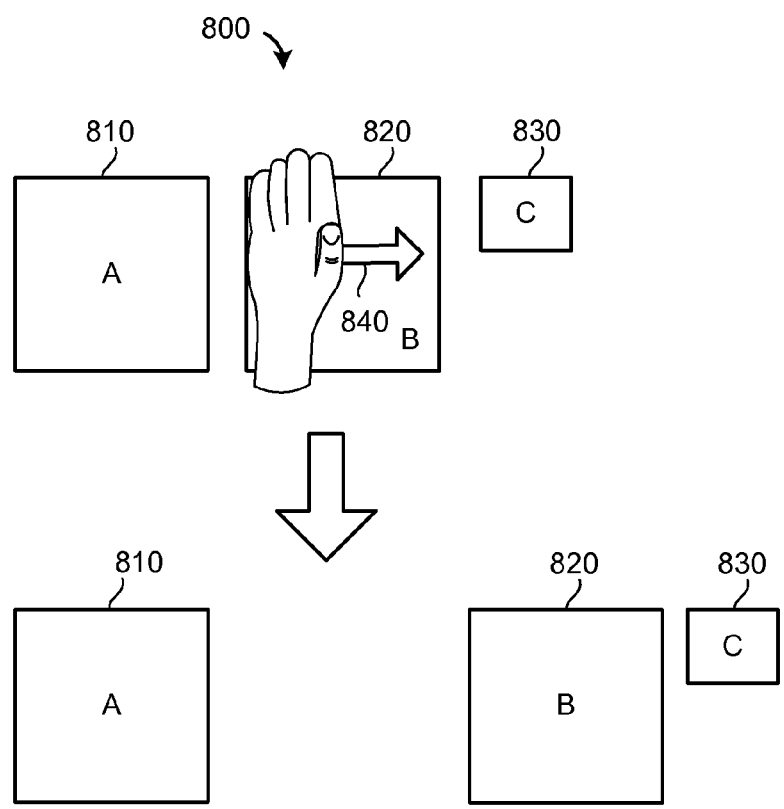
FIG. 8 is a diagram illustrating a process for modifying a display of hierarchical relationships for display windows in accordance with an example embodiment.

FIG. 8 is a diagram 800 illustrating a process for modifying a display of hierarchical relationships for display windows in accordance with an example embodiment, such as may be displayed using thumbnail images as described herein. It will be appreciated, however, that the approach described with respect to FIG. 8 may be equally applied to embodiments in which hierarchal relationships between display windows are illustrated using tabs, such as previously described with respect to FIG. 2A, for example.

The example shown in FIG. 8, a root browsing window A is represented by a thumbnail 810, a root browsing window B is represented by a thumbnail 820 and a subordinate browsing window C is represented by a thumbnail 830. As may be seen in the diagram 800, the subordinacy of the browsing window C to the root browsing window B is visually indicated by the relative size of the thumbnail 830 and its placement with respect to the thumbnail 820.

As shown in the top portion of the diagram 800, using a touch-screen display, a user may apply a push-gesture 840 to thumbnail 820 by placing the side of his or her hand on the touch-screen display and sliding his or her hand to the right. Alternatively, such a push-gesture 840 may be applied to other thumbnails and in other directions. The results of the push gesture 840 are shown in the bottom portion of the diagram 800. In this example, the push gesture 840 results a visual space being made between the thumbnails 810 and 820. Also, the thumbnail 830 (representing the display window C) moves in tandem with the thumbnail 820 representing the root display window B. In other embodiments, other results may occur when creating using the push gesture 840.

Figure 9:
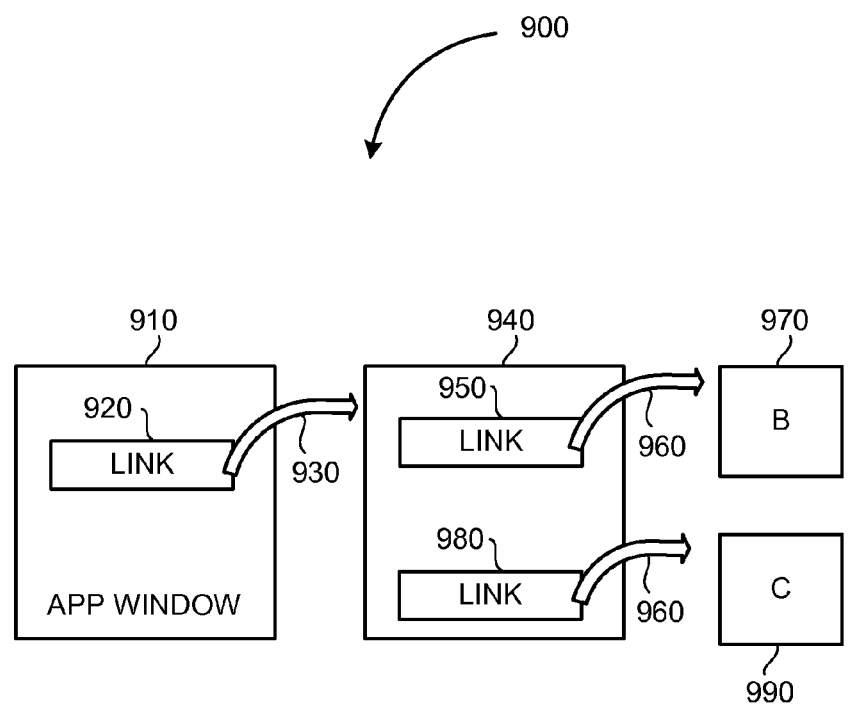
FIG. 9 is a diagram illustrating a process for spawning display windows in accordance with an example embodiment.

FIG. 9 is a diagram 900 illustrating a process for spawning display windows in accordance with an example embodiment. The process illustrated by FIG. 9 is given by way of example and other techniques for spawning display windows and illustrating hierarchical relationships may be used, such as using the techniques described herein or using a number of other appropriate approaches. The process of the diagram 900 may be implemented using the computing device 100 illustrated in FIG. 1. Accordingly, the diagram 900 is described with further reference to FIG. 1. It will be appreciated, however, that other computing devices having other arrangements may be used to implement the process shown in FIG. 9.

As shown in FIG. 9, an application window 910 may be launched on the computing device 100. Such an application window 910 may be launched by selecting a corresponding application icon using the GUI of the computing device 100. For instance, the application window 910 may be launched by clicking on its corresponding application icon using a mouse, selecting the icon by touching it on a touch-screen display or by performing a pinch-out gesture on the icon, as some examples. As shown in the diagram 900, the application window 910 may include a link 920. The link 920 may be, for example, a hyperlink that is included in an e-mail or document that is displayed in the application window 910. As shown in FIG. 9, selecting or performing a toss-gesture 930 on the link 920 may result in a root browser window A 940 being spawned.

As shown in the diagram 900 the root browser window A 940 may include links 950 and 980. In like fashion as the toss-gesture 930 discussed above, using respective toss-gestures 960 on the links 950 and 980 may spawn, respectively, a subordinate browser window B 970 and a subordinate browser window C 990, where the subordinacy of the browser window B 970 and the browser window C 990 to the root browser window A 940 are visually indicated in the diagram 900, in like fashion as has been previously described. It will be appreciated that the hierarchical relationships of the browser windows A 940, B 970 and C 990 may be illustrated in other fashions, such as using a tab arrangement, such as has been described herein.

Figure 10:
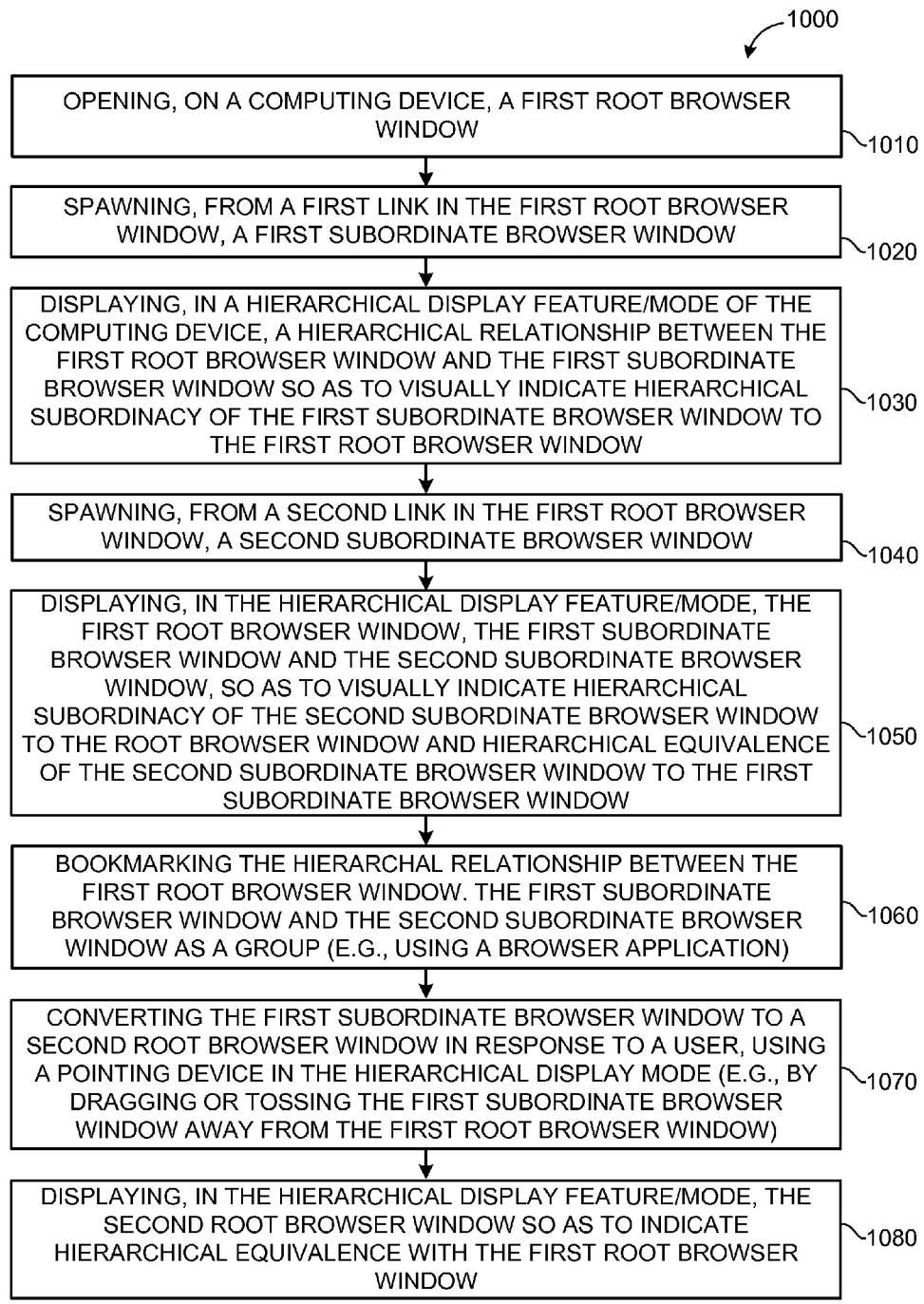
FIG. 10 is a flowchart illustrating a method for providing a graphical user interface in accordance with an example embodiment.

FIG. 10 is a flowchart illustrating a method 1000 for providing a graphical user interface in accordance with an example embodiment. The method 1000 may be implemented using the techniques described herein. Accordingly the method 1000 will be described with further reference to the other figures of the application, as appropriate. It will be appreciated, however, that the method 1000 may be implemented using approaches other than those specifically described herein.

At block 1010, the method 1000 includes opening, on a computing device (such as the computing device 100), a first root browser window. The first root browser window of block 1010 may be opened (e.g., launched or spawned) using the approaches discussed above with respect FIGS. 3A and 3B, for example, or a number of other appropriate techniques. At block 1020, the method 1000 includes spawning, from a first link in the first root browser window, a first subordinate browser window. In this example, the first root browser window of block 1010 may be implemented by the root browser window A 940 in FIG. 9 and the first subordinate browser window of block 1020 may be implemented by the browser window B 970.

The method 1000 further includes, at block 1030, displaying a hierarchical relationship between the first root browser window and the first subordinate browser window, so as to visually indicate hierarchical subordinacy of the first subordinate browser window to the first root browser window, such as using the techniques described herein. For instance, the hierarchical relationships of block 1030 may be illustrated using a hierarchical display feature of a GUI, which may be implemented in conjunction with a single window display feature or separately in a hierarchical display mode, such as described herein. Depending on the particular embodiment, the approach for illustrating such hierarchical relationships may vary. For example, tabs or thumbnails may be used in the manners described herein to illustrate such hierarchal relationships.

At block 1040, the method 1000 further includes spawning, from a second link in the first root browser window, the second subordinate browser window. In this example, the first root browser window of block 1040 may also be implemented by the root browser window A 940 in FIG. 9, and the second subordinate browser window may be implemented by the browser window C 990 shown in FIG. 9. At block 1050, in like fashion as the operation at block 1030, the method 1000 includes displaying hierarchical relationships of the first root browser window the first subordinate browser window and the second subordinate browser window so as to visually indicate the subordinacy of the first subordinate browser window and the second subordinate browser window to the root browser window. At block 1060, the method 1000 includes bookmarking the hierarchal relationships between the first root browser window, the first subordinate browser window and the second subordinate browser window as a group. As has been previously described, the bookmarking operation of block 1060 may be accomplished using a browser application, such as the browser 150 illustrated in FIG. 1.

At block 1070, the method 1000 includes converting the first subordinate browser window to a second root browser window. As was discussed above with respect to FIGS. 6A and 6B, the first subordinate browser window may be converted to the second root browser window in response to a user dragging or tossing the first subordinate browser window away from the first root browser window in a strip display of thumbnails or a set of tabs in a tab display, such as in those approaches previously described with respect to FIGS. 2A and 2B, for example. At block 1080, the method 1000 includes displaying the hierarchical equivalence of the second root browser window with the first root browser window, in like fashion as was discussed above with respect to FIG. 6B.

Figure 11:
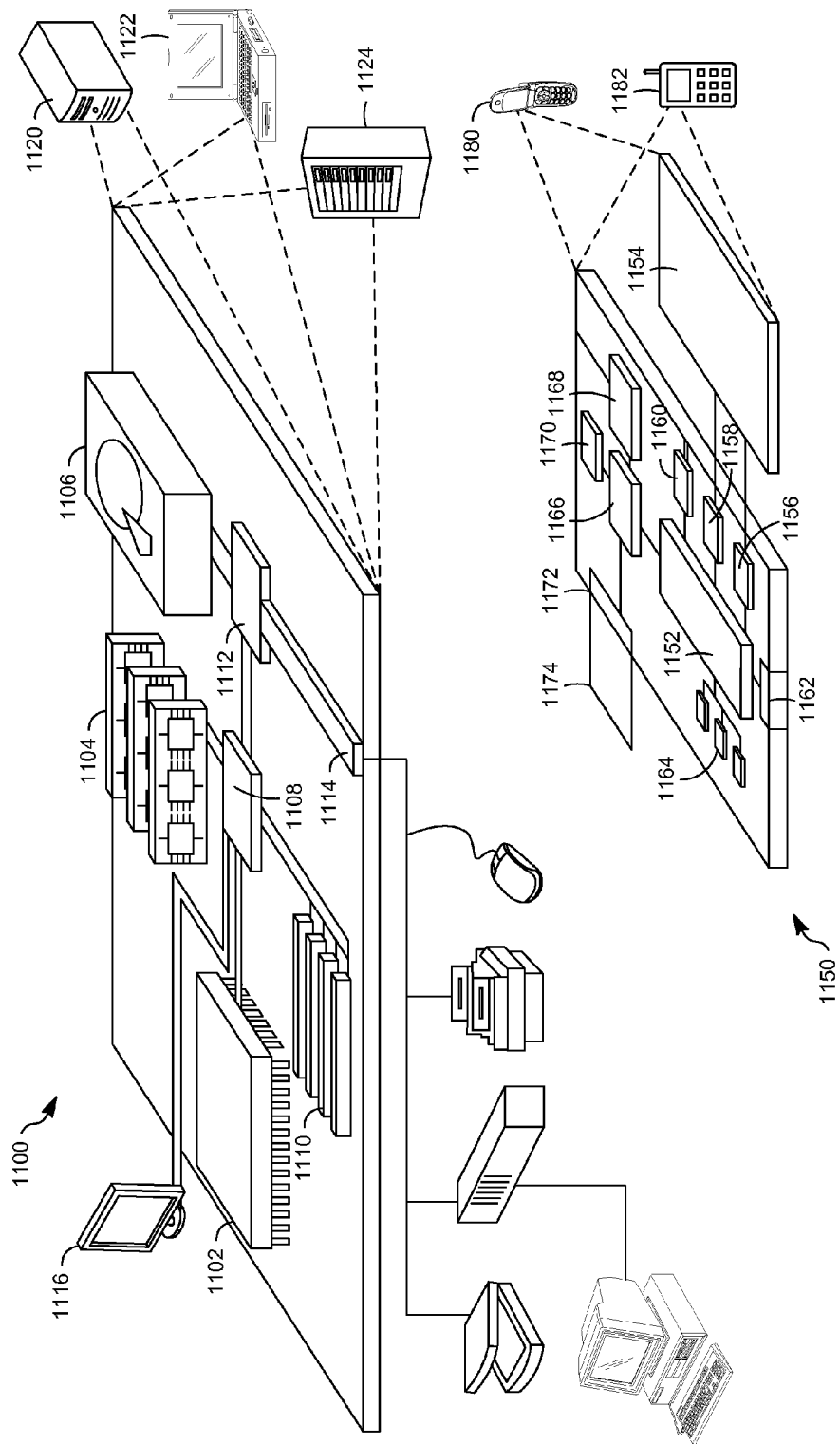
FIG. 11 is a diagram that illustrates a computing device and a mobile computing device that can be used to implement the techniques described herein in accordance with an example embodiment.

FIG. 11 is a diagram that shows an example of a generic computer device 1100 and a generic mobile computer device 1150, which may be used with the techniques described here. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The computing device 1150 may also be provided with a storage device, such as a microdrive or other device, to provide additional storage. Each of the components 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a web browser application through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computing device comprising:
 a touch-screen display device;
 a processor; and
 a non-transitory, machine-readable medium having instructions stored thereon, wherein the instructions, when executed by the processor, cause the computing device to render, on the touch-screen display device, a graphical user interface (GUI), the GUI having a plurality of display modes including:
 a hierarchical display mode configured to display hierarchical relationships between a plurality of individual display windows by displaying the plurality of individual display windows with differences in at least one of a relative size or placement, wherein the hierarchical relationships each indicate one of superordinacy or subordinacy between at least two display windows of the plurality of individual display windows; and
 a single window display mode configured to display only one of the plurality of individual display windows as a single window and to display the hierarchical relationships between at least some of the plurality of individual display windows by displaying tabs representing at least some of the plurality of individual display windows other than the single window, the plurality of individual display windows including:
 a first root window displayed as the single window; and
 a first subordinate window represented by a first subordinate window tab, wherein:
 the first subordinate window tab is spawned within the first root window in response to receiving a first user selection, associated with a link displayed in the first root window; and
 the first subordinate window tab, in the single window display mode, is displayed and overlaid at an edge of the first root window, so as to visually indicate hierarchical subordinacy to the first root window,
 wherein receiving the first user selection comprises:
 receiving, by the computing device, an indication of the link being selected as a result of contact with the touch-screen display device at a location of the link;
 and
 receiving, by the computing device an indication that the contact with the touch-screen display device has ended;
 wherein in response to receiving a second user selection associated with the first subordinate window tab, the single window display mode is configured to:
 display the first subordinate window as the single window, and
 display a first root window tab representing the first root window within the first subordinate window, wherein the first root window tab is overlaid at a first edge of the first subordinate window, so as to visually indicate hierarchical superordinacy of the first root window with respect to the first subordinate window;
 wherein the plurality of individual display windows further includes a second subordinate window, the second subordinate window being represented by a second subordinate window tab displayed within the first subordinate window, and
 wherein the second subordinate window tab is overlaid at a second edge of the first subordinate window, opposite the first edge of the first subordinate window, so as to visually indicate hierarchical subordinacy of the second subordinate window with respect to the first root window, and to further visually indicate, with respect to the first root window, hierarchical equivalence between the first subordinate window and the second subordinate window;

wherein the instructions, when executed by the processor, further cause the computing device to:

switch from the hierarchical display mode to the single window display mode with a selected one of the plurality of individual display windows as the single window in response to receiving an indication of a first gesture at a location associated with the selected one of the plurality of individual display windows; and switch from the single window display mode to the hierarchical display mode in response to receiving an indication of a second gesture at a location associated with the single window.

2. The computing device of claim 1, wherein:

the second subordinate window represented by the second subordinate window tab is spawned within the first root window.

3. The computing device of claim 2, wherein the instructions, when executed by the processor, further cause the computing device to execute a web browser application, the web browser application being configured to provide for bookmarking, as a hierarchical group, the first root window, the first subordinate window and the second subordinate window.

4. The computing device of claim 2, wherein the instructions, when executed by the processor, further cause the computing device to spawn the second subordinate window tab in response to a user selecting a link displayed in the first root window.

5. The computing device of claim 1, wherein the instructions, when executed by the processor, further cause the computing device to spawn the second subordinate window represented by the second subordinate window tab in response to one of:

receiving a third user selection, associated with a link displayed in the first subordinate window, the third user selection being performed at the touch-screen display device; and determining, based on the indication of the third user selection, a selection of the link displayed in the first subordinate window.

6. The computing device of claim 1, wherein:

the plurality of individual display windows further includes a third subordinate window, the third subordinate window represented by a third subordinate window tab that is:

spawned within the first subordinate window; and overlaid, in the single window display mode, as the third subordinate window tab at the second edge of the first subordinate window opposite the first edge of the first subordinate window, so as to visually indicate hierarchical subordinacy of the third subordinate window with respect to the first root window, and to further visually indicate, with respect to the first root window, hierarchical equivalence between the first subordinate window and the third subordinate window.

7. The computing device of claim 1, wherein the instructions, when executed by the processor, further cause the computing device, while operating in the hierarchical display mode, to convert the first subordinate window to a second root window in response to receiving a third user selection, associated with a drag gesture, wherein receiving the third user selection comprises:

receiving, by the computing device, an indication of the first subordinate window being selected as a result of contact with the touch-screen display device at a location of the first subordinate window;

receiving, by the computing device, an indication of the drag gesture away from the first root window; and receiving, by the computing device and during the drag gesture, an indication that the contact with the touch-screen display device has ended.

8. The computing device of claim 1, wherein the instructions, when executed by the processor, further cause the computing device to alter, over time, a respective appearance of each of the first root window tab and the first subordinate window tab to indicate a respective amount of time that each of the first root window and the first subordinate window has been open.

9. The computing device of claim 1, wherein receiving the first gesture comprises:

receiving, by the computing device, an indication of at least one of the plurality of individual display windows being selected as a result of contact with the touch-screen display device at a location of the at least one of the plurality of individual display windows;

receiving, by the computing device, an indication of a pinch out gesture from the location of the at least one of the plurality of individual display windows being selected at the touch-screen display device; and receiving, by the computing device and during the pinch out gesture, an indication that the contact with the touch-screen display device has ended.

10. The computing device of claim 1, wherein receiving the second gesture comprises:

receiving, by the computing device, an indication of a pinch in gesture from the location of at least one of the plurality of individual display windows being selected at the touch-screen display device; and receiving, by the computing device and during the pinch in gesture, an indication that the contact with the touch-screen display device has ended.

11. The computing device of claim 1, wherein the plurality of individual display windows, while operating in the hierarchical display mode further comprise a second root window.

12. The computing device of claim 11, wherein the instructions, when executed by the processor, further cause the computing device to, in response to receiving, by the computing device, an indication of a user push-gesture performed in the hierarchical display mode at the touch-screen display device, visually space the second root window away from the first root window.

13. The computing device of claim 1, wherein:

the instructions, when executed by the processor, further cause the computing device to spawn the first root window from a link in a native application display window; and the first root window and the first subordinate window are browser display windows.

14. The computing device of claim 1, wherein the instructions, when executed by the processor, further cause the computing device to execute a web browser application, the web browser application being configured to provide for bookmarking, as a hierarchical group, the first root window and the first subordinate window.

15. A computer-implemented method comprising:

opening, by a computing device, a first root browser window;

spawning, within the first root browser window displayed as a single browser window, in response to receiving a first user selection associated with a link displayed in the first root browser window, a first subordinate browser window represented by a first subordinate window tab;

outputting, by the computing device, a graphical user interface (GUI), the GUI having a plurality of display modes including:

a hierarchical display mode configured to display hierarchical relationships between a plurality of browser windows by displaying the plurality of browser windows with differences in at least one of a relative size or placement, wherein the hierarchical relationships each indicate one of superordinacy or subordinacy between at least two browser windows of the plurality of browser windows; and a single window display mode configured to display only one of the plurality of browser windows as the single browser window and to display the hierarchical relationships between at least some of the plurality of browser windows by displaying tabs representing at least some of the plurality of browser windows other than the single browser window, wherein the first subordinate browser window tab is displayed and overlaid at an edge of the first root browser window, so as to visually indicate hierarchical subordinacy of the first subordinate browser window with respect to the first root browser window, wherein receiving the first user selection comprises:

receiving, by the computing device, an indication of the link being selected as a result of contact with a touch-screen display device at a location of the link;

receiving, by the computing device, an indication that contact with the touch-screen display device has ended;

wherein in response to receiving a second user selection associated with the first subordinate browser window tab, the single window display mode comprises:

displaying, by the computing device, the first subordinate browser window as the single browser window, displaying, by the computing device, a first root browser window tab representing the first root browser window within the first subordinate browser window, wherein the first root browser window tab is overlaid at a first edge of the first subordinate browser window, so as to visually indicate hierarchical superordinacy of the first root browser window with respect to the first subordinate browser window, and displaying, by the computing device and in the single window mode, a second subordinate browser window tab representing a second subordinate browser window displayed within the first subordinate window;

wherein the second subordinate browser window tab is overlaid at a second edge of the first subordinate browser window, opposite the first edge of the first browser subordinate window, so as to visually indicate hierarchical subordinacy of the second subordinate browser window with respect to the first root browser window, and to further visually indicate, with respect to the first root browser window, hierarchical equivalence between the first browser subordinate window and the second subordinate browser window;

switching from the hierarchical display mode to the single window display mode with a selected one of the plurality of browser windows as the single browser window in response to receiving an indication of a first gesture at a location associated with the selected one of the plurality of browser windows; and switching from the single window display mode to the hierarchical display mode in response to receiving an indication of a second gesture at a location associated with the single browser window.

16. The computer-implemented method of claim 15, further comprising:

spawning, within the first root browser window, from a second link in the first root browser window, the second subordinate browser window represented by the second subordinate browser window tab.

17. The computer-implemented method of claim 15, further comprising:

converting, while operating in the hierarchical display mode, the first subordinate browser window to a second root browser window in response to receiving, by the computing device, a third user selection, associated with a drag gesture, wherein receiving the third user selection comprises:

receiving, by the computing device, an indication of the first subordinate browser window being selected as a result of contact with the touch-screen display device at a location of the first subordinate browser window;

receiving, by the computing device, an indication of the drag gesture away from the first root browser window;

and receiving, by the computing device and during the drag gesture, an indication that the contact with the touch-screen display device has ended.

18. A non-transitory, machine-readable medium having instructions stored thereon, the instructions, when executed by a processor, cause a computing device to:

render, for display at a graphical user interface (GUI), the GUI having a plurality of display modes including:

a hierarchical display mode configured to display hierarchical relationships between a plurality of individual display windows by displaying the plurality of individual display windows with differences in at least one of a relative size or placement, wherein the hierarchical relationships each indicate one of superordinacy or subordinacy between at least two display windows of the plurality of individual display windows; and a single window display mode configured to display only one of the plurality of individual display windows as a single window and to display the hierarchal relationships between at least some of the plurality of individual display windows by displaying tabs representing at least some of the plurality of individual display windows other than the single window, the plurality of individual display windows including:

a first root window displayed as the single window; and a first subordinate window represented by a first subordinate window tab, wherein:

the first subordinate window tab is spawned within the first root window in response to the computing device receiving a first user-selection, associated with a link displayed in the first root window; and the first subordinate window tab, in the single window display mode, is displayed and overlaid at an edge of the first root window, so as to visually indicate hierarchical subordinacy to the first root window, wherein receiving the first user selection comprises:

receiving, by the computing device, an indication of the link being selected as a result of contact with a touch-screen display device at a location of the link; and receiving, by the computing device, an indication that contact with the touch-screen display device has ended;

wherein in response to receiving a second user selection, associated with the first subordinate window tab, the single window display mode is configured to:

display the first subordinate window as the single window, and display a first root window tab representing the first root window within the first subordinate window, wherein the first root window tab is overlaid at a first edge of the first subordinate window, so as to visually indicate hierarchical superordinacy of the first root window with respect to the first subordinate window;

wherein the plurality of individual display windows further includes a second subordinate window, the second subordinate window being represented by a second subordinate window tab displayed within the first subordinate window, and wherein the second subordinate window tab is overlaid at a second edge of the first subordinate window, opposite the first edge of the first subordinate window, so as to visually indicate hierarchical subordinacy of the second subordinate window with respect to the first root window, and to further visually indicate, with respect to the first root window, hierarchical equivalence between the first subordinate window and the second subordinate window;

switch from the hierarchical display mode to the single window display mode with a selected one of the plurality of individual display windows as the single window in response to receiving an indication of a first gesture at a location associated with the selected one of the plurality of individual display windows; and switch from the single window display mode to the hierarchical display mode in response to receiving an indication of a second gesture at a location associated with the single window.

19. The machine-readable medium of claim 18, wherein the instructions, when executed by the processor, further cause the computing device to execute a web browser application, the web browser application being configured to provide for bookmarking, as a hierarchical group, the first root window, the first subordinate window and the second subordinate window.

20. The machine-readable medium of claim 18, wherein the instructions, when executed by the processor, further cause the computing device, while operating in the hierarchical display mode, to convert the first subordinate window to a second root window in response to receiving a third user selection, associated with a drag gesture, wherein receiving the third user selection comprises:
receiving, by the computing device, an indication of the first subordinate window being selected as a result of contact with the touch-screen display device at a location of the first subordinate window;

receiving, by the computing device, an indication of the drag gesture away from the first root window; and receiving, by the computing device and during the drag gesture, an indication that the contact with the touch-screen display device has ended.

21. The machine-readable medium of claim 18, wherein receiving the first gesture comprises:

receiving, by the computing device, an indication of at least one of the plurality of individual display windows being selected as a result of contact with the touch-screen display device at a location of the at least one of the plurality of the individual display windows;

receiving, by the computing device, an indication of a pinch out gesture from the location of the at least one of the plurality of individual display windows being selected at the touch-screen display device; and receiving, by the computing device during the pinch out gesture, an indication that the contact with the touch-screen display device has ended.

22. The machine-readable medium of claim 18, wherein receiving the second gesture comprises:

receiving, by the computing device, an indication of a pinch in gesture from the location of the at least one of the plurality of individual display windows being selected at the touch-screen display device; and receiving, by the computing device during the pinch in gesture, an indication that the contact with the touch-screen display device has ended.

23. The computing device of claim 1, wherein the first user selection further comprises receiving, by the computing device, an indication of a sliding motion away from the location of the link being selected at the touch-screen display device.

24. The computer-implemented method of claim 15, wherein the first user selection further comprises receiving, by the computing device, an indication of a sliding motion away from the location of the link being selected at the touch-screen display device.

25. The machine-readable medium of claim 18, wherein the first user selection further comprises receiving, by the computing device, an indication of a sliding motion away from the location of the link being selected at the touch-screen display device.

* * * * *